United States Patent
Chen

(10) Patent No.: US 6,944,423 B2
(45) Date of Patent: Sep. 13, 2005

(54) STRUCTURE FOR PREVENTING INTERMODULATION INTERFERENCE IN SATELLITE TRANSMISSION

(75) Inventor: Mao-Jen Chen, Taoyuan (TW)

(73) Assignee: Prime Electronics & Satellitcs, Inc., Taoyuan (TW)

(*) Notice: Subject to any disclaimer, the term of this patent is extended or adjusted under 35 U.S.C. 154(b) by 459 days.

(21) Appl. No.: 10/281,305

(22) Filed: Oct. 28, 2002

(65) Prior Publication Data
US 2004/0082298 A1 Apr. 29, 2004

(51) Int. Cl.[7] .............................. H04B 1/10; H04B 15/00
(52) U.S. Cl. ...................... 455/3.02; 455/295; 455/296; 455/303; 375/348
(58) Field of Search ............................... 455/3.02, 63.1, 455/295, 296, 283, 552.1, 67.13, 303, 317; 375/346, 348

(56) References Cited

U.S. PATENT DOCUMENTS 6,424,817 B1 * 7/2002 Hadden et al. ............ 455/3.02
2003/0021367 A1 * 1/2003 Smith ........................ 375/346
2003/0083034 A1 * 5/2003 Motoyama .................. 455/323
2003/0181180 A1 * 9/2003 Darabi et al. ............ 455/234.1

* cited by examiner

Primary Examiner—Simon Nguyen
(74) Attorney, Agent, or Firm—Troxell Law Office PLLC

(57) ABSTRACT

A structure for preventing intermodulation interference in satellite transmission is characterized in that a frequency subtraction is executed at a first mixer and a local oscillator on one of the received satellite vertical and horizontal polarized signals to obtain a first mid-band, while a frequency subtraction is executed at a second mixer and a first-stage local oscillator on the other received signal to obtain a reverse-phase signal thereof, and a frequency addition is executed at a third mixer and a second-stage local oscillator on the reverse-phase signal to obtain a second mid-band, and that second and third harmonic differences between a frequency obtained by subtracting the oscillating frequency of the second-stage local oscillator from the oscillating frequency of the first-stage local oscillator and the oscillating frequency of the local oscillators do not fall in the first and the second mid-bands, respectively, and an intermodulation interference is prevented.

3 Claims, 4 Drawing Sheets

STRUCTURE FOR PREVENTING INTERMODULATION INTERFERENCE IN SATELLITE TRANSMISSION

FIELD OF THE INVENTION

The present invention relates to a structure for preventing intermodulation interference in satellite transmission, in which a mid-band is generated through down-converting twice, so that second and third harmonic differences between a frequency obtained by subtracting an oscillating frequency of a second-stage local oscillator from an oscillating frequency of a first-stage local oscillator and an oscillating frequency of a local oscillators do not fall in two mid-bands generated with the structure of present invention, so that an intermodulation interference is prevented. A multiplex adder of the structure of the present invention may be connected to the structure by way of plugging to enable convenient carrying of the structure.

BACKGROUND OF THE INVENTION

FIG. 1 shows the structure of a conventional satellite transmission apparatus. As shown, the conventional satellite transmission apparatus mainly includes a receiving antenna 1', an RF amplifying system a', two band-pass filters 2a', 2b', two mixers 3a', 3b', two local oscillators 4a', 4b', a high-pass filter 5', a low-pass filter 6', and a multiplex adder 7'.

The receiving antenna 1' receives vertical and horizontal polarized signals from a satellite. The received vertical and horizontal signals are down-converted and amplified at the RF amplifying system a', and then filtered at the band-pass filters 2a' and 2b', respectively. Frequency subtraction operations are then executed at the mixers 3a' and 3b' to subtract frequencies of the filtered vertical and horizontal signals from oscillating frequencies of the local oscillators 4a' and 4b', respectively. Signals output from the mixers 3a' and 3b' are filtered at the high-pass and the low-pass filters 5' and 6', respectively, to filter and isolate noises therefrom to generate two different and non-repeated mid-bands. The two mid-bands are added at the multiplex adder 7'. However, second and third harmonic differences obtained from the oscillating frequencies of the two local oscillators 4a' and 4b' separately fall in the ranges of these two mid-bands to result in intermodulation interference.

To enable better understanding of many drawbacks of the above-described conventional satellite transmission apparatus of FIG. 1, an example thereof is now described in more details.

Please refer to FIG. 1. The receiving antenna 1' receives a satellite vertical polarized signal having a frequency within the range from 11.7 to 12.2 GHz, and a satellite horizontal polarized signal also having a frequency within the range from 11.7 to 12.2 GHz. These signals are filtered at the band-pass filters 2a' and 2b', respectively. The local oscillators 4a' and 4b' have oscillating frequencies of 10.75 GHz and 10.15 GHz, respectively. The frequency of the filtered vertical signal is subtracted from the oscillating frequency of the local oscillator 4a' to obtain a maximum vertical frequency of 1450 MHz (i.e., 12.2 GHz−10.75 GHz=1.45 GHz=1450 MHz) and a minimum vertical frequency of 950 MHz (i.e., 11.7 GHz−10.75 GHz=0.95 GHz=950 MHz) for a first mid-band, as shown in FIG. 2A. Meanwhile, the frequency of the filtered horizontal signal is subtracted from the oscillating frequency of the local oscillator 4b' to obtain a maximum horizontal frequency of 2050 MHz (i.e., 12.2 GHz−10.15 GHz=2.05 GHz=2050 MHz) and a minimum horizontal frequency of 1550 MHz (i.e., 11.7 GHz−10.15 GHz=1.55 GHz=1550 MHz) for a second mid-band, as shown in FIG. 2B. Signals within the frequency ranges of the above two mid-bands are then filtered and isolated at the high-pass filter 5' and the low-pass filter 6', respectively, to generate two mid-bands, which are combined at the multiplex adder 7', as shown in FIG. 2C. The second harmonic difference between the local oscillators 4a' and 4b' is 2×10.75 GHz−2×10.15 GHz=1.2 GHz=1200 MHz; and the third harmonic difference between the local oscillators 4a' and 4b' is 3×10.75 GHz−3×10.15 GHz=1.8 GHz=1800 MHz. These two harmonic differences separately fall in the ranges of the two resultant mid-bands, as shown in FIG. 2D, to cause intermodulation interference.

SUMMARY OF THE INVENTION

A primary object of the present invention is to provide a structure for preventing intermodulation interference in satellite transmission, in which a mid-band that is generated through down-converting twice and another mid-band are generated, so that second and third harmonic differences between a frequency obtained by subtracting an oscillating frequency of a second-stage local oscillator from an oscillating frequency of a first-stage local oscillator and an oscillating frequency of a local oscillators do not fall in the ranges of these two mid-bands to prevent an intermodulation interference.

Another object of the present invention is to provide a structure for preventing intermodulation interference in satellite transmission, in which a multiplex adder may be connected to the structure by way of plugging to enable convenient carrying of the structure.

To achieve the above and other objects, the structure of the present invention mainly includes a receiving antenna for receiving vertical and horizontal polarized signals from a satellite, an RF amplifying system and first and second band-pass filters for separately down-converting and filtering the received signals, a first mixer and a local oscillator for executing a frequency subtraction operation on one of the signals output from the first band-pass filter to generate a first mid-band, a high-pass filter for filtering and isolating the signal within the frequency range of the first mid-band, a second mixer and a first-stage local oscillator for executing a frequency subtraction operation on another signal output from the second band-pass filter to obtain a signal having a reverse-phase frequency, a third band-pass filter for filtering and isolating the signal output from the second mixer, a third mixer and a second-stage local oscillator for executing a frequency addition operation on the signal output from the third band-pass filter to generate a second mid-band, a low-pass filter for filtering and isolating the signal within the frequency range of the second mid-band, and a multiplex adder for combining the first and the second mid-band. Second and third harmonic differences between a frequency obtained by subtracting the oscillating frequency of the second-stage local oscillator from the oscillating frequency of the first-stage local oscillator and the oscillating frequency of the local oscillators do not fall in the frequency ranges of the first and the second mid-bands, respectively, so that an intermodulation interference is prevented. And, the multiplex adder may be otherwise plugged to the high-pass and the low-pass filter that filter and isolate signals within the frequency ranges of the first and the second mid-band.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
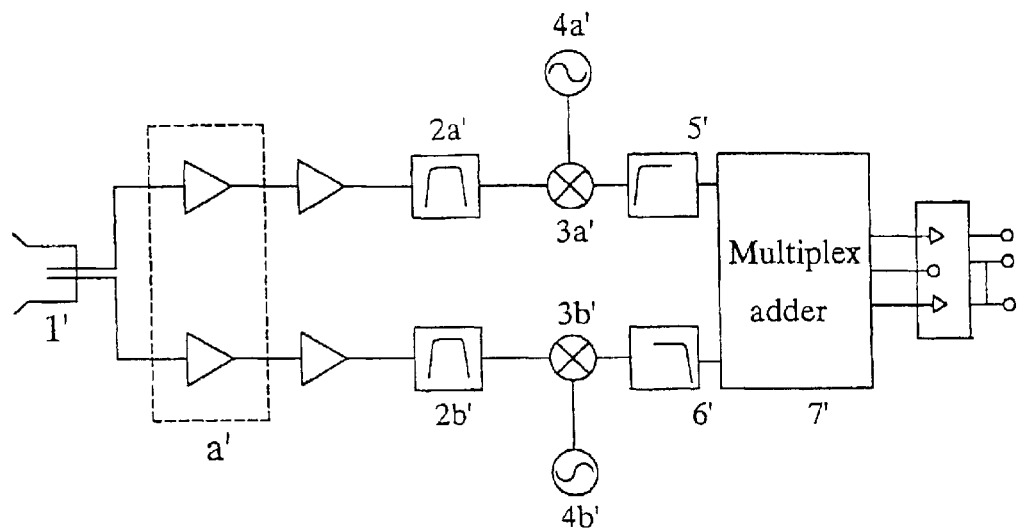
FIG. 1 shows the structure of a conventional satellite transmission apparatus.
Figure 2A:
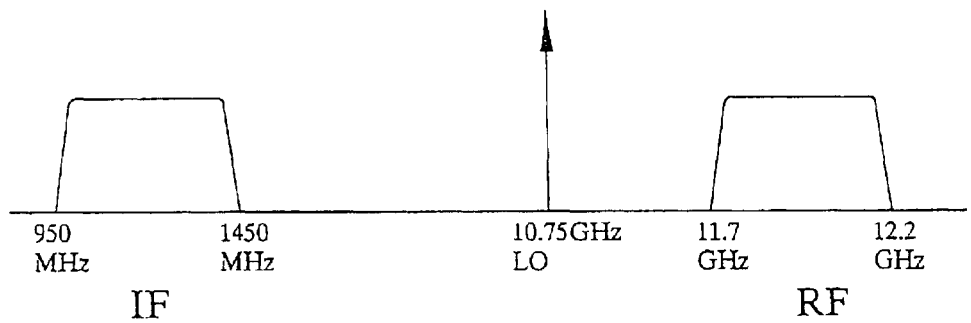
FIG. 2A shows a mid-band for a satellite signal in the conventional satellite transmission apparatus of FIG. 1.
Figure 2B:
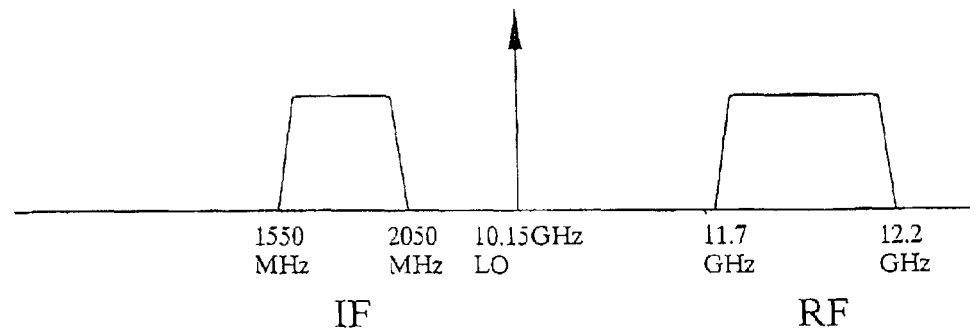
FIG. 2B shows another mid-band for a satellite signal in the conventional satellite transmission apparatus of FIG. 1.
Figure 2C:
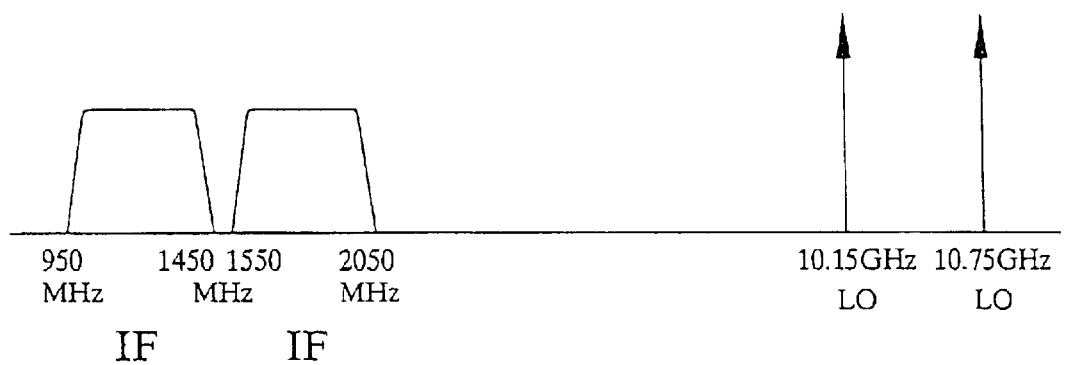
FIG. 2C shows a combined mid-band of the two mid-bands of FIGS. 2A and 2B.
Figure 2D:
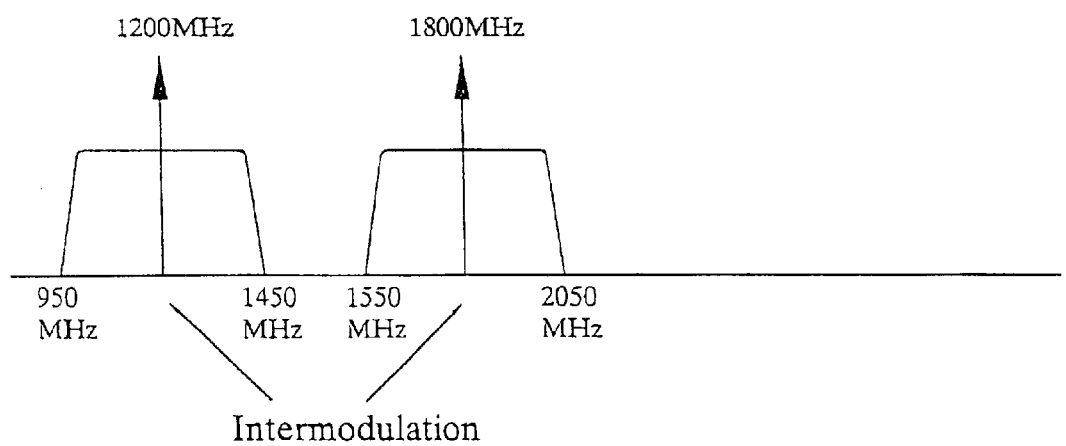
FIG. 2D shows the intermodulation interference in the conventional satellite transmission.
Figure 3:
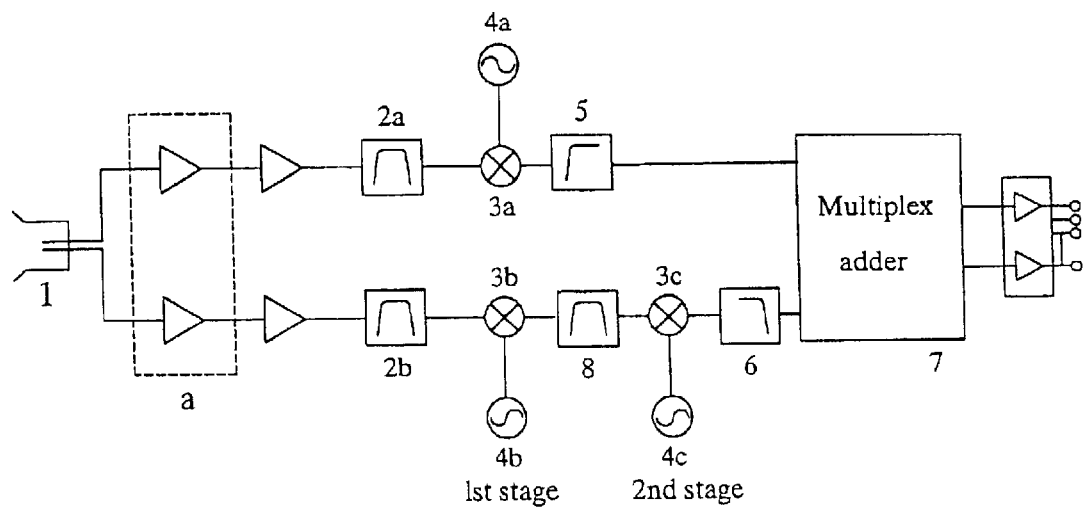
FIG. 3 shows the structure for preventing intermodulation interference in satellite transmission according to the present invention.

Please refer to FIG. 3 that shows the structure for preventing intermodulation interference in satellite transmission. As shown, the structure mainly includes a receiving antenna 1, an RF amplifying system a, band-pass filters 2a, 2b, 8, mixers 3a, 3b, 3c, a local oscillators 4a, a first-stage local oscillator 4b, a second-stage local oscillator 4c, a high-pass filter 5, a low-pass filter 6, and a multiplex adder 7.

The receiving antenna 1 receives vertical and horizontal polarized signals sent from a satellite. The received signals are down-converted and amplified at the RF amplifying system a. The down-converted and amplified signals are then separately sent to the band-pass filters 2a and 2b and filtered thereat. Frequency subtraction operations are executed at the mixers 3a and 3b to subtract frequencies of the filtered signals from oscillating frequencies of the local oscillator 4a and the first-stage local oscillator 4b, respectively.

That is, the frequency of the signal output from the band-pass filter 2b is subtracted from the oscillating frequency of the first-stage local oscillator 4b at the mixer 3b, and the resultant signal is isolated and filtered at the band-pass filter 8. A reverse-phase signal of the signal output from the band-pass filter 8 is then sent to the mixer 3c, at where a frequency addition operation is executed to add a frequency of the reverse-phase signal to an oscillating frequency of the second-stage local oscillator 4c to generate a mid-band. The signal within the frequency range of this mid-band is then isolated and filtered at the low-pass filter 6 to remove noises therefrom and be down-converted for a second time. The signal output from the low-pass filter 6 is then sent to the multiplex adder 7. The above-described structure and technique constitute the features of the present invention.

Meanwhile, the frequency of the signal output from the band-pass filter 2a is subtracted from the oscillating frequency of the local oscillator 4a at the mixer 3a to generate another mid-band. The signal within the frequency range of another mid-band is filtered and isolated at the high-pass filter 5, and then sent to the multiplex adder 7.

The multiplex adder 7 combines the above two mid-bands. It is noted that second and third harmonic differences between a frequency obtained by subtracting the oscillating frequency of the second-stage local oscillator 4c from the oscillating frequency of the first-stage local oscillator 4b and the oscillating frequency of the local oscillators 4a do not fall in the frequency ranges of these two mid-bands. Therefore, the occurrence of intermodulation interference can be prevented.

Figure 4A:
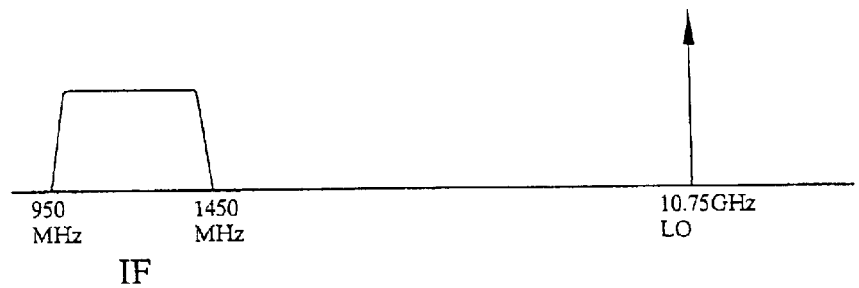
FIG. 4A shows a mid-band for a satellite signal in the structure of the present invention of FIG. 3.
Figure 4B:
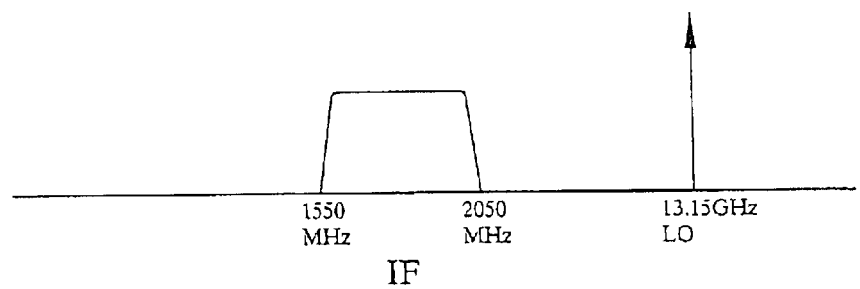
FIG. 4B shows another mid-band for a satellite signal in the structure of the present invention of FIG. 3.
Figure 4C:
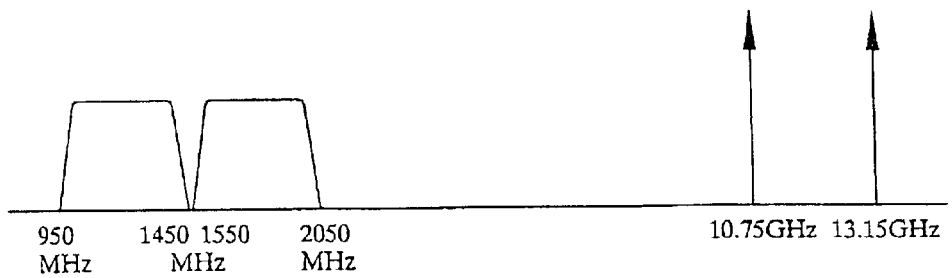
FIG. 4C shows a combined mid-band of the two mid-bands of FIGS. 4A and 4B.
Figure 4D:
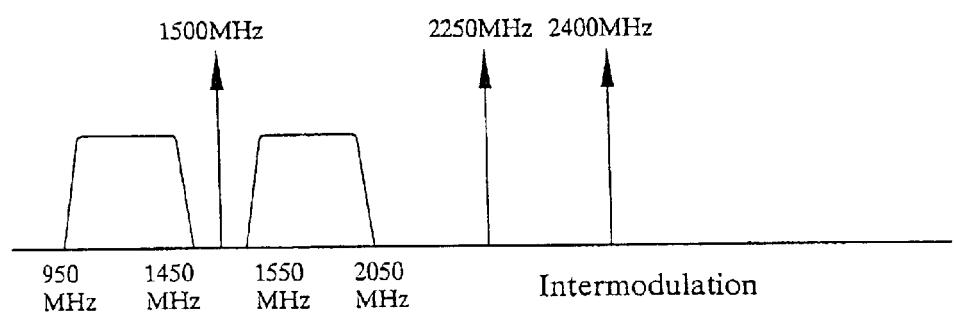
FIG. 4D shows the intermodulation interference in the satellite transmission with the structure of the present invention.

To enable an even better understanding of many advantages of the present invention, an example of the present invention will now be described in more details with reference to the accompanying drawings. Please refer to FIG. 3. The receiving antenna 1 receives a satellite vertical polarized signal having a frequency within the range from 11.7 to 12.2 GHz, and a satellite horizontal polarized signal having a frequency within the range from 11.7 to 12.2 GHz. The received signals are separately filtered at the band-pass filters 2a and 2b. The frequency of the filtered signal output from the band-pass filter 2a is subtracted from the oscillating frequency of 10.75 GHz of the local oscillator 4a to obtain a maximum frequency of 1450 MHz (i.e., 12.2 GHz−10.75 GHz=1.45 GHz=1450 MHz) and a minimum frequency of 950 MHz (i.e., 11.7 GHz−10.75 GHz=0.95 GHz=950 MHz) of a mid-band for the signal output from the band-pass filter 2a, as shown in FIG. 4A. Meanwhile, the frequency of the filtered signal output from the band-pass filter 2b is subtracted from the oscillating frequency of −13.15 GHz of the first-stage local oscillator 4b at the mixer 3b to obtain a reverse-phase frequency of a maximum frequency of −950 MHz (i.e., −(13.15−12.2)GHz=−0.95 GHz=−950 MHz) and a reverse-phase frequency of a minimum frequency of −1450 MHz (i.e., −(13.15−11.7)GHz=−1.45 GHz=−1450 MHz). The signal output from the mixer 3b is filtered and isolated at the band-pass filter 8 and then output to the mixer 3c, at where a frequency addition operation is executed to add the frequency of the signal output from the band-pass filter 8 to the oscillating frequency of 3 GHz of the second-stage local oscillator 4c to obtain a maximum frequency of 2050 MHz (i.e., −0.95 GHz+3 GHz=2.05 GHz=2050 MHz) and a minimum frequency of 1550 MHz (i.e., −1.45 GHz+3 GHz=1.55 GHz=1550 MHz) of another mid-band, as shown in FIG. 4B. Signals within the frequency ranges of the above two mid-bands are then isolated and filtered at the high-pass and the low-pass filter 5 and 6, respectively, and combined at the multiplex adder 7. The combined signal is shown in FIG. 4C. The second and the third harmonic difference between the frequency of 1000 Mhz obtained by subtracting the oscillating frequency of 3.15 GHz of the second-stage local oscillator 4c from the oscillating frequency of 13.15 GHz of the first-stage local oscillator 4b (i.e., 13.15 GHz−3.15 GHz=10 GHz=1000 MHz) and the oscillating frequency of 10.75 GHz of the local oscillator 4a, that is, (2×10.75)GHz−(2×10)GHz=1.5 GHz=1500 MHz and (3×10.75)GHz−(3×10)GHz=2.25 GHz=2550 MHz, do not fall in the frequency ranges of the two mid-bands obtained from the structure of the present invention, as shown in FIG. 4D.

Figure 5:
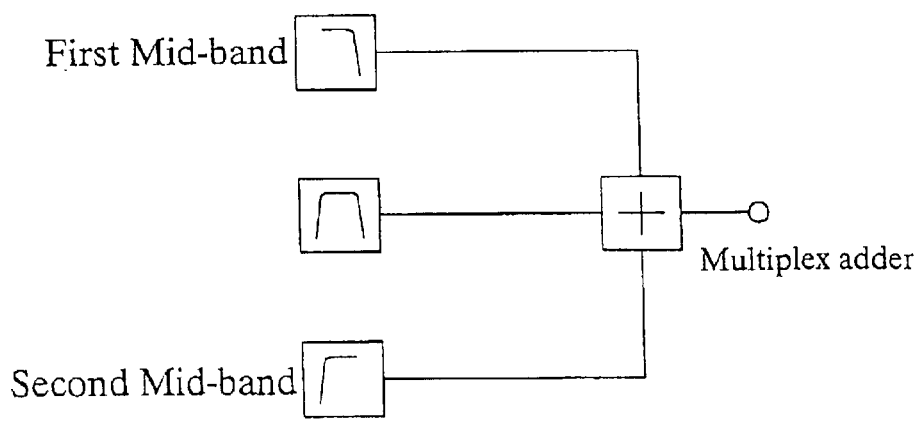
FIG. 5 shows the connection of a multiplex adder in another embodiment of the present invention.

FIG. 5 shows another embodiment of the present invention. In this embodiment, the multiplex adder 7 is connected to the satellite transmission apparatus by way of plugging.

That is, the multiplex adder 7 may be plugged to the high-pass and the low-pass filter 5 and 6 that separately filter and isolate the signals within the frequency ranges of the two mid-bands, so that a user receiving satellite signals may conveniently carry the apparatus along with him.

The present invention has been described with a preferred embodiment thereof and it is understood that many changes and modifications in the described embodiment can be carried out without departing from the scope and the spirit of the invention as defined by the appended claims.

What is claimed is:

1. A structure for preventing intermodulation interference in satellite transmission, comprising:

a receiving antenna for receiving vertical and horizontal polarized signal sent from a satellite;

an RF amplifying system for down-converting and amplifying the received vertical and horizontal signals;

a first and a second band-pass filter for filtering signals output from said RF amplifying system;

a first mixer for receiving a signal output from said first band-pass filter and executing a frequency subtraction operation;

a local oscillator, from an oscillating frequency of which a frequency of said signal output from said first band-pass filter is subtracted in the frequency subtraction operation at said first mixer to generate a first mid-band;

a high-pass filter for filtering and isolating a signal within said first mid-band and output from said first mixer, and outputting the filtered and isolated signal;

a second mixer for receiving the signal filtered at and output from said second band-pass filter and executing a frequency subtraction operation;

a first-stage local oscillator, from an oscillating frequency of which a frequency of said signal output from said second band-pass filter is subtracted in the frequency subtraction operation executed at said second mixer to obtain a reverse-phase signal of said signal output from said second band-pass filter;

a third band-pass filter for filtering and isolating said reverse-phase signal output from said second mixer;

a third mixer for receiving the signal output from said third band-pass filter and executing a frequency addition operation;

a second-stage local oscillator, to an oscillating frequency of which a frequency of said signal output from said third band-pass filter is added in the frequency addition operation executed at said third mixer to obtain a second mid-band;

a low-pass filter for filtering and isolating a signal within said second mid-band and output from said third mixer, and outputting the filtered and isolated signal; and a multiplex adder for receiving and combining said signals separately output from said high-pass filter and said low-pass filter;

whereby second and third harmonic differences between a frequency obtained by subtracting the oscillating frequency of said second-stage local oscillator from the oscillating frequency of said first-stage local oscillator and the oscillating frequency of said local oscillators do not fall in said first and said second mid-bands, respectively, and an intermodulation interference can therefore be prevented.

2. The structure for preventing intermodulation interference in satellite transmission as claimed in claim 1, wherein a frequency subtraction operation is executed at said second mixer to subtract the frequency of said signal output from said second band-pass filter from the oscillating frequency of said first-stage local oscillator to obtain a reverse-phase signal, which is filtered and isolated at said third band-pass filter and then output to said third mixer, at where a frequency addition operation is executed to add the frequency of said signal output from said third band-pass filter to the oscillating frequency of said second-stage local oscillator to obtain said second mid-band.

3. The structure for preventing intermodulation interference in satellite transmission as claimed in claim 1, wherein said multiplex adder is plugged to said high-pass and said low-pass filter that filter and isolate said signals within frequency ranges of said first and said second mid-band and output from said first and said third mixer, respectively.

* * * * *